Patented Aug. 5, 1952

2,606,177

UNITED STATES PATENT OFFICE 2,606,177

DEHYDROHALOGENATION OF POLYVINYLCHLORIDE

John Downing, Spondon, near Derby, England, assignor to Celanese Corporation of America, a corporation of Delaware No Drawing. Application October 2, 1947, Serial No. 777,595. In Great Britain October 9, 1946

3 Claims. (Cl. 260—92.8)

This invention relates to polymers, and has as a principal object to obtain from polyvinyl chloride a mouldable material of improved heat softening point and resistance to solvent action.

A disadvantage of polyvinyl chloride is its low heat softening point which is such that at temperatures above about 70° C. plastic flow under load occurs, the flow increasing as the temperature is raised. The present invention is directed to overcoming this defect and obtaining from polyvinyl chloride a mouldable material which can be vulcanised to give a product which does not exhibit plastic flow even at temperatures above 70° C., and which is also more highly resistant than polyvinyl chloride towards swelling agents and solvents for polyvinyl chloride.

According to the invention, a vulcanisable polymer is obtained by removing from an acetone-insoluble polyvinyl chloride about 3–10% of its combined hydrogen chloride. There is thus obtained a polymer of the empirical formula:

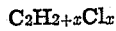

$$C_2H_{2+x}Cl_x$$

where $x=0.90$ to $0.97$. The development of a yellow to red colour during dehydrochlorination indicates that the polymer contains conjugated double bonds. The polymer can be plasticized, for example, by means of the plasticisers commonly used for polyvinyl chloride, to form a composition which can be moulded or extruded, and which can be treated so as to vulcanize the polymer by a method such as is known for the vulcanisation of natural rubber, e. g. by a heat treatment in the presence of elementary sulphur, zinc oxide and a vulcanisation accelerator.

The proportion of combined hydrogen chloride removed is important. If less than about 5% be removed, the tenacity of the vulcanised polymer may be somewhat low and the desired resistance to flow under load at elevated temperatures may not be obtained, although even when dehydrochlorination is only between 3 and 4% sufficient vulcanisation can be effected in 30 minutes at 140° C. to enable the vulcanisate to be removed at that temperature from the mould and to impart to the material a most valuable increase in resistance to organic liquids. If more than about 10% is removed, plasticisation becomes difficult or impossible. The best results have been obtained by removing between 5 and 7% of combined hydrogen chloride.

The invention includes compositions containing the polymer, a plasticiser therefor and an anti-oxidant. The compositions preferably contain also vulcanising agents, e. g. elementary sulphur a metallic oxide such as zinc oxide and a vulcanisation accelerator such as is used in vulcanising natural rubber. By treating compositions according to the invention so as to vulcanise the polymer, materials are obtained of high resistance to organic solvents, i. e. materials that swell less than a Perbunan type synthetic rubber in acetone, ethylene dichloride, nitrobenzene and aromatic hydrocarbons.

The dehydrohalogenation is preferably carried out by the action of a strong base, preferably caustic potash, on the polyvinyl chloride in the presence of an alcoholic compound preferably a partial ether of a glycol such as the mono-methyl ether of ethylene glycol or the monoethyl ether of diethylene glycol. The operation may be carried out by suspending the polyvinyl chloride in the alcoholic compound and reacting it with anhydrous caustic alkali at temperatures in the neighbourhood of 100° C. Other dehydrohalogenating agents can be used, for example quaternary ammonium bases such as benzyl trimethyl ammonium hydroxide.

Plasticisers for polyvinyl chloride are generally suitable for plasticising the dehydrohalogenated material. Among such plasticisers are tricresyl phosphate, tributyl phosphate, dibutyl phthalate, diamyl phthalate, dihexyl phthalate, and dioctyl phthalate, dibutyl-glycol phthalate, methyl phthallyl ethyl glycollate, ethyl phthallyl ethyl glycollate, and butyl phthallyl butyl glycollate. Other substances that can be used as plasticisers are solid linear co-polymers of conjugated dienes with acrylonitrile or methacrylonitrile, e. g. the butadiene-acrylonitrile co-polymer of nitrogen content about 11% sold as "Hycar OR 15." The use of such polymers as plasticisers is of advantage on account of the solvent resistance of the plasticiser which results in enhanced solvent-resistance in the composition.

The anti-oxidant, which is necessary to prevent or minimise premature hardening of the polymer especially when heated, is preferably beta-phenyl naphthylamine but other substances known as anti-oxidants for natural rubber, and capable of incorporation in the cold may be used, e. g. di-betanaphthyl-para-phenylene diamine, para-phenyl phenol, the di-ortho-tolyl-guanidine salt of di-catechol borate sold as "Permalux."

The plasticiser may be incorporated with the dehydrohalogenated polymer by milling, e. g. in a roller mill at an appropriate temperature. The anti-oxidant should be present at the outset and until this has been incorporated the rolls should be kept cool. In the absence of vulcanising agents the rolls may be heated, e. g. to 100–200° C., during incorporation of the plasticiser, once the anti-oxidant is incorporated. Milling in the presence of vulcanising agents is preferably carried out without heat.

Elementary sulphur is preferably used as the vulcanising agent. Thus, sulphur may be incorporated in the plasticised material preferably together with zinc oxide, and an organic accelerator and a soap-acid; e. g. stearic acid, may also be present. Reinforcing agents, for example reinforcing blacks, or white reinforcing fillers having a basis, for example, of alumina or silica, can also be incorporated in this way. Pigments can also be incorporated at this stage. The resulting mix can then be vulcanised in a similar way to a natural rubber mix. Other methods of vulcanisation such as are suitable for natural rubber can be employed, for example instead of sulphur, an aromatic nitro compound or quinone may be used in conjunction with an oxide of lead, or the mix in the form of thin sheets or thin walled articles can be vulcanised by exposure to sulphur chloride.

The following examples illustrate the invention, the parts being by weight:

EXAMPLE 1

62.5 parts of polyvinyl chloride were suspended in 450 parts of the mono-methyl ether of ethylene glycol containing 2.37 parts of caustic potash. The reaction mixture was heated at 90–100° C. for 2 hours. In this way 3–4% of the combined hydrogen chloride was removed.

The polymer was then compounded on the roll mill to give a mix of the following composition:

100 parts of polymer
2 parts of beta-phenyl-naphthylamine
66 parts of dibutyl phthalate
8 parts of zinc oxide
5 parts of sulphur
2 parts of a 1:1 mixture of mercapto-benzthiazole and diphenyl guanidine.

The various components were incorporated in the order in which they are mentioned above except that some of the plasticiser was added at the same time as the anti-oxidant; the rolls were kept cool except that during the later stages of the working in of the plasticiser, after the anti-oxidant had been evenly incorporated, the temperature was allowed to rise to 100 to 120° C.

This composition was vulcanised in a press at about 150° C. for 30 minutes.

Gaskets and sealing rings of the material were found very suitable for use in contact with aromatic hydrocarbons.

EXAMPLE 2

The dehydrochlorinated polymer of Example 1 was compounded to give a mix of the following composition:

100 parts of the polymer
2 parts of beta-phenyl-naphthylamine
75 parts of dibutyl phthalate
12.5 parts of zinc oxide
50 parts of carbon black
7.5 parts of sulphur
3 parts of a 1:1 mixture of mercapto-benzthiazole and diphenyl guanidine This mix was vulcanised in a press at 140° C. for 30 minutes and gave a product similar to that of Example 2, and having about the same extension but of more than twice the tenacity.

The effect of various organic liquids on the vulcanised materials of the two examples compared with the effect under the same conditions on polyvinyl chloride plasticised with its own weight of tricresyl phosphate and on "Perbunan" synthetic rubber, is shown in the following table in which the swelling percentages were determined as laid down in British Standard Specification No. B. S. S. 903/1940 page 57. In the table, "P. V. C." represents the plasticised polyvinyl chloride referred to, "A1" is the vulcanised material of Example 1, and "A2" that of Example 2.

Table

| Liquid | Material | Swelling % after 3 days | Swelling % after 7 days |
|---|---|---|---|
| Acetone | P. V. C. | 93.0 | 99.6 |
| | Perbunan | 166 | 169 |
| | A1 | 6.9 | 9.2 |
| | A2 | 17.9 | 17.9 |
| Ethylene dichloride | P. V. C. | 267 | 275 |
| | Perbunan | 430 | 435 |
| | A1 | 70.5 | 70.5 |
| | A2 | 60.7 | 62.8 |
| Nitrobenzene | P. V. C. | 409 | 409 |
| | Perbunan | 390 | 397 |
| | A1 | 96.0 | 96.0 |
| | A2 | 83.0 | 86.0 |

EXAMPLE 3

The dehydrochlorination was carried out as in Example 1 except that 3.64 parts of caustic potash were used and in consequence about 6% of combined hydrogen chloride was removed.

A mix of the following composition was made:

100 parts of polymer
2.0 parts of beta-phenyl-naphthylamine
75 parts of tricresyl phosphate
7.5 parts of zinc oxide
2.5 parts of sulphur
3.0 parts of a 1:1 mixture of mercapto-benzthiazole and diphenyl guanidine.

Vulcanisation was carried out in a press at 140° C. for 30 minutes.

The polymer showed good resistance to acetone, ethylene dichloride, nitrobenzene and aromatic hydrocarbons. It had about twice the tenacity of the product of Example 1 and about 10% less extension.

The polymers and compositions of the invention are particularly useful in the manufacture of gaskets, sealing rings, liners, flexible piping and the like, on account of their resistance to solution or excessive swelling by a large range of organic liquids. The invention also includes the use of the polymers, for example in the form of the compositions of the invention, in forming coatings, for example on textile fabrics, the polymer being subsequently vulcanised.

Having described my invention, what I desire to secure by Letters Patent is:

1. A process for the manufacture of a vulcanizable polymer, which comprises removing from an acetone-insoluble polyvinyl chloride 5 to 10% of its content of combined hydrogen chloride by treatment with an alkali metal hydroxide in the presence of a partial ether of a glycol.

2. A process for the manufacture of a vulcanizable polymer, which comprises removing from an acetone-insoluble polyvinyl chloride 5 to 10% of its content of combined hydrogen chloride by heating the polyvinyl chloride to a temperature in the neighborhood of 100° C. with a solution of potassium hydroxide in the monomethyl ether of ethylene glycol.

3. The plasticisable, vulcanisable high polymer obtained by the process of claim 2.

JOHN DOWNING.

(References on following page)

REFERENCES CITED

The following references are of record in the file of this patent:

UNITED STATES PATENTS

| Number | Name | Date |
|---|---|---|
| 2,274,616 | Raynolds | Feb. 24, 1942 |
| 2,387,571 | Fikentscher | Oct. 23, 1945 |
| 2,451,174 | Reuter | Oct. 12, 1948 |
| 2,536,114 | Weaver | Jan. 2, 1951 |

FOREIGN PATENTS

| Number | Country | Date |
|---|---|---|
| 6,299 of 1912 | Great Britain | Apr. 10, 1913 |

OTHER REFERENCES

Compounding Ingredients for Rubber (2nd ed., 1947), compiled by India Rubber World Editors (pp. 120, 148, 188).

Fierz-David: Helv. Chim. Acta. 28, 455–64 (1945) Abstracted in Nat. Paint, Varn. and Lacq. Assn., Abst. No. 120 (January 1947).